L. D. HART.
SILO.
APPLICATION FILED SEPT. 4, 1917.
1,301,051.
Patented Apr. 15, 1919.
2 SHEETS—SHEET 1.
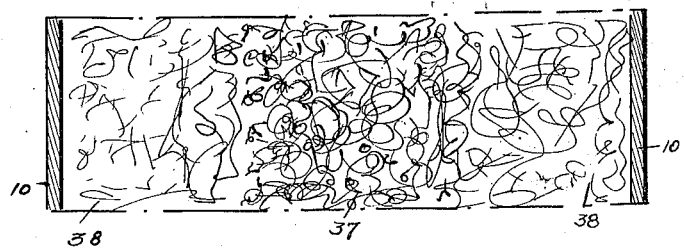
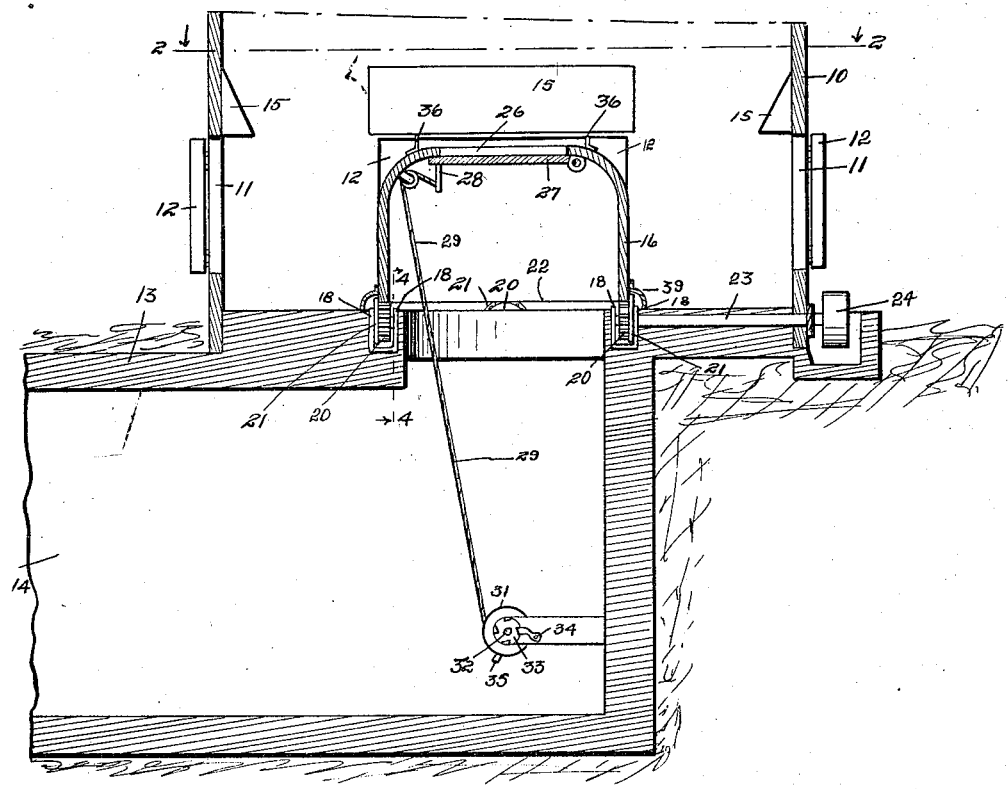

L. D. HART.
SILO.
APPLICATION FILED SEPT. 4, 1917.
1,301,051.
Patented Apr. 15, 1919.
2 SHEETS—SHEET 2.
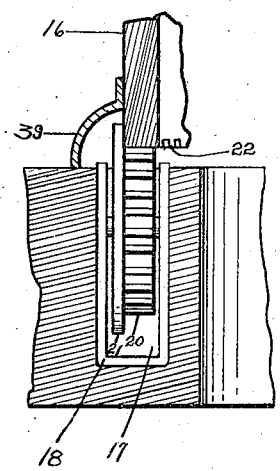
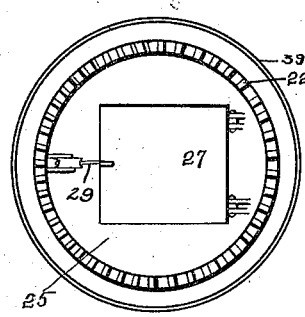
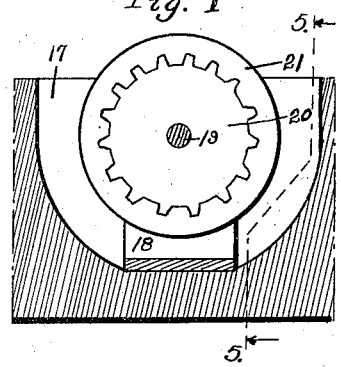
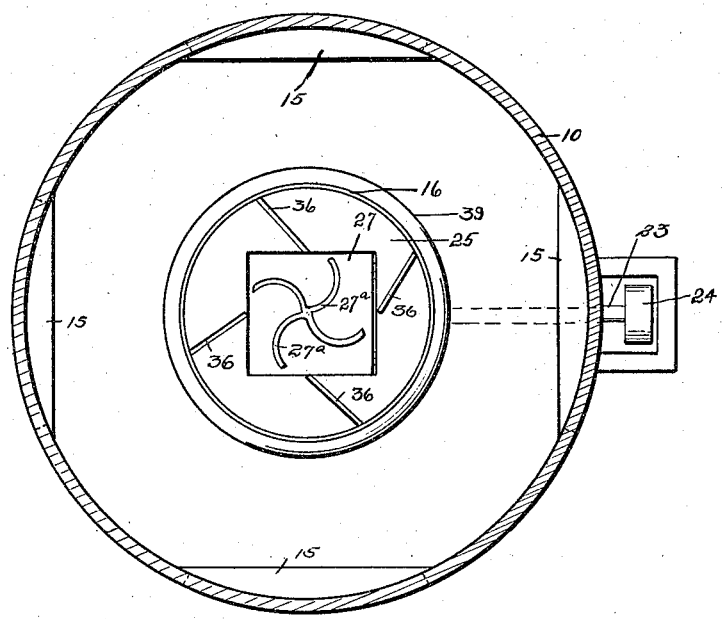
Witness
Will Freeman
Inventor
Loren D Hart
BY Orwig & Bair
Attys

UNITED STATES PATENT OFFICE.

LOREN D. HART, OF DICKENS, IOWA.

SILO.

1,301,051.     Specification of Letters Patent.     Patented Apr. 15, 1919.

Application filed September 4, 1917. Serial No. 189,503.

*To all whom it may concern:*

Be it known that I, LOREN D. HART, a citizen of the United States, and resident of Dickens, in the county of Clay and State of Iowa, have invented a certain new and useful Silo, of which the following is a specification.

The object of my invention is to provide a silo so constructed and arranged as to do away largely with the labor of removing the ensilage.

A further object is to provide such a silo so constructed that stock may be fed directly from the lower portion of the silo.

More particularly in this connection it is my object to provide such a silo having openings around its lower portion through which the stock may feed on the contents of the silo, and having parts so constructed as to control the lowering of the ensilage to position accessible from said openings.

Still a further object is to provide in such a silo means for agitating the ensilage for causing it to be lowered to position adjacent to said openings, and to thereby loosen the ensilage to cause it to drop properly.

Still a further object is to provide in such a silo means whereby a portion of the ensilage, for instance that portion located in the central part of the silo, may be taken from the silo separately from the rest of the ensilage.

In other words, it is one of the objects of my invention to provide a silo so constructed and arranged that the ensilage may be taken from the silo in two grades, the construction being such that the poorer grade constituting the larger part of the ensilage, including the fodder and leaves, may be fed direct from the bottom of the silo, whereas the richer corn containing part of the ensilage may be removed through the bottom of the center of the silo as desired.

With these and other objects in view, my invention consists in the construction, arrangement and combination of the various parts of the device, whereby the objects contemplated are attained, as hereinafter more fully set forth, pointed out in my claims, and illustrated in the accompanying drawings, in which:

Figure 1 shows a vertical, central, sectional view through the lower portion of a silo embodying my invention.

Fig. 2 shows a horizontal, sectional view, taken on the line 2—2 of Fig. 1.

Fig. 3 shows an inverted plan view of the upwardly extending cylindrical member in the center of the silo.

Fig. 4 shows a vertical, sectional view, taken on the line 4—4 of Fig. 1.

Fig. 5 is a vertical, sectional view, taken on the line 5—5 of Fig. 4, and

Fig. 6 is a vertical, central view through the upper portion of a filled silo, illustrating diagrammatically the arrangement of the ensilage in grades.

In the drawings herewith I have used the reference numeral 10 to indicate generally the wall of a circular silo structure. It is well known that ordinarily the silo is provided with a series of vertically spaced doors, or with a continuous vertical door opening through which the ensilage may be removed, and it is the ordinary custom to remove first the ensilage at the top of the silo.

My improved silo 10 is built with a plurality of door openings 11 at or near the bottom of the silo, said door openings being designed to be closed by means of the hinged doors or the like 12, during the filling of the silo and up until the time when the ensilage is to be used. The silo 10 is built upon a strong solid foundation 13, and below the silo is a suitable passageway 14 leading to a point beneath the center of the silo, as shown in Fig. 1.

On the interior of the silo I provide one or more members 15 located above the level of the door openings 11 and preferably formed with upper inner surfaces inclined from the silo wall downwardly and inwardly, as illustrated in Fig. 1. The members 15 form guide or chute devices adapted to prevent the ensilage from dropping directly downwardly across the door openings, and to tend to shoot the ensilage inwardly as it drops to the bottom of the silo.

In the center of the silo, at the bottom thereof, I provide an upwardly extending cylindrical member 16 which may have a variety of forms and may have its upper end closed or open, as the user of the silo may desire. The member 16 serves to form a device in the lower center of the silo for causing the ensilage to slide outwardly into the space between the center of the silo and the door openings 11.

A silo of the kind hereinbefore described may be used and stock may be fed directly from the silo. The stock may eat through the door openings 11, and on account of the arrangement of the members 15 and the cylindrical member 16, the silage will tend to be held against sliding downwardly while the stock eat away the ensilage between the member 16 and the walls of the silo. The ensilage can be caused to drop downwardly by working it down from below with a stick or fork or the like, so that practically the entire contents of the silo may be fed directly from the silo to animals which eat the contents of the silo through the door openings 11.

If desired, however, means may be provided for agitating the ensilage for causing it to drop downwardly after it has been eaten away at the bottom of the silo, and I have shown one means for causing such agitation.

In the illustration herewith I have shown in the floor of the silo a plurality of openings 17, in each of which openings is mounted an upwardly extending U-shaped bracket 18, the arms of which form bearings for a shaft 19. On each shaft 19 is mounted a gear 20 having at one side the peripheral flange 21 extending radially beyond the teeth of the gear 20. The lower edge of the cylindrical member 16 is provided with gear teeth 22 which mesh with and travel upon the teeth of the gears 20.

One of the shafts 19 is formed with an extension 23 extending laterally preferably beneath the upper surface of the floor of the silo and through the wall of the silo. The shaft extension 23 is provided at its outer end with a gearing device 24 which may be connected with an engine or other suitable source of motive power, wherefrom rotation may be imparted to the shaft extension 23 and to the gearing 20 connected therewith for imparting rotation to the cylindrical member 16. By so imparting rotation to the member 16 it will be seen that the ensilage will be agitated sufficiently to cause the ensilage to drop downwardly into the space between the member 16 and the silo wall.

It will be understood that the member 16 may be made in a variety of forms and may be open or closed at its upper end. In the form of the device shown in the drawings I have shown the member 16 provided with a top or cover member 25 having a central opening 26 below which is hinged a door 27 provided near its free edge with a downwardly extending bracket 28, through which is extended a rope or other flexible member 29. The flexible member 29 is extended from the bracket 28 over a guide or pulley 30 at the upper interior of the cylindrical member 16, and thence downwardly and around a drum 31 mounted below the center of the member 16 and supported on a shaft 32. Operatively connected with the drum 31 is a ratchet wheel 33, adjacent to which is a pawl 34. The shaft 32 is provided with a crank handle 35.

On the upper surface of the cover 25 on the cylindrical member 16 there may be provided ribs or the like 36 for engaging the ensilage and imparting greater agitation thereto when the cylindrical member 16 is operated. On the door 27 are ribs or the like 27a.

As has already been seen, the structure of my silo is such that the contents thereof may be fed directly from the silo without carrying them to any distant point.

In case the ensilage should pack just above the members 15 and the member 16, it will readily be seen that such ensilage may be agitated and disturbed by means of a stick or the like inserted through a door opening 11, or by means of a stick inserted through the opening 26. Thus practically the entire contents of the silo could be fed directly through the door openings 11.

My silo has, however, another function which under ordinary circumstances is important. It is well known that considerable corn is cut up with ordinary ensilage for the reason that the ears are too green to be removed from the stalks for ordinary storage at the time the ensilage is cut and put into the silo. Ensilage is ordinarily fed into the top central portion of the silo through a pipe or the like by means of a blower. It will be seen that if the discharge end of the pipe is simply hung downwardly the leaves and lighter portions of the stalk will naturally tend to fall to the outside of the pile of ensilage, while the heavy corn will drop in the central portion of the silo. Thus in Fig. 6 I have illustrated by the reference character 37 the heavier richer grade of ensilage in the central portion of the silo, and by the numeral 38 the lighter and poorer grade of ensilage found around the outer portion of the interior of the silo.

It will readily be seen that there are certain times in feeding a herd of stock when it is desirable to feed the poorer grade of ensilage to some stock and to feed a greater or entire portion of the richer grade 37 of the ensilage to other stock. With my silo as herein illustrated, the two grades of ensilage can be to a very large extent separated for feeding. By releasing the pawl 34 and lowering the door 27, a portion of the richer grade of the ensilage will be permitted to pass downwardly through the opening 26 to the passage 14, from whence the richer ensilage may be removed for feeding to cattle or other stock at any desired point. Even when the richer portion of the ensilage is thus removed through the passage 14, it will be obvious that the lighter and poorer ensilage may still be fed directly from the silo.

Whenever the ensilage sticks in the silo, the member 16 may be revolved for properly agitating the contents of the silo and causing such contents to drop downwardly.

It will readily be seen that if it is desired, the door 27 may be lowered and the member 16 rotated whereupon the richer grade of ensilage may be fed downwardly through the opening 26 to the passage 32 and used at any time without taking the greater bulk of the poorer and lighter weight ensilage.

There may be provided at the bottom of the member 16 at the outside thereof, an annular shield 39 for protecting the flanges 21 and gears 20 from the ensilage.

The advantages of a silo of the construction hereinbefore set forth may be very largely seen from the foregoing description.

A silo of this kind does away with practically all of the heavy labor of removing the ensilage from the silo for feeding it to stock. It will readily be seen that the stock can be permitted to feed indiscriminately through the door openings 11, or that stanchions can be built adjacent to the different door openings. The supply of ensilage furnished and accessible through the different door openings can be quite accurately regulated with a device of this kind.

A comparatively little work is necessary for getting the ensilage down to the bottom of the silo at any time.

The silo wall may be suitably strengthened between the doors.

Where the form of the device shown in my invention, or an equivalent form, is used, it will be seen that the ensilage may be separated into two grades by removing the central portion of the ensilage through the opening 26 and the passageway 14. Thus the richer portion of the ensilage may be used for fattening stock and the other portion of the ensilage may be used for other stock.

It may be mentioned in this connection that the member 16 may be used with or without the gearing device for rotating the member, and with or without the door 27, as may be desired.

In case it is desired to carry over part of the ensilage for another season, the doors 12 and 27 are closed and the central agitating member or cylindrical member may be operated for causing the ensilage to drop downwardly and entirely fill the space in the lower part of the silo between the cylinder 16 and the wall of the silo, leaving the ensilage packed down in condition for preservation until the next season.

The rotatable member may be rotated for a distance in one direction and then in the other direction if desired.

It will, of course, be understood that tight joints are provided at the doors so as to keep the outside air away from the ensilage. It may be mentioned in this connection that the shield 39 is pressed tightly against the floor of the silo, and against the member 16 so as to form a tight joint there to prevent a circulation of air to the ensilage.

Numerous changes may be made in the construction and arrangement of the various parts of my improved silo, without departing from the essential features and purposes of my invention, and it is my intention to cover by my claims any modified forms of structure or use of mechanical equivalents which may be reasonably included within their scope.

I claim as my invention:

1. A silo having at its lower portion a plurality of openings through which animals may feed, and a central upwardly extending cylindrical member at the bottom of said silo.

2. A silo having at its lower portion a plurality of openings through which animals may feed, a device on the interior of the silo above the level of said openings, for engaging downwardly moving ensilage, and a central upwardly extending cylindrical member at the bottom of said silo.

3. A silo having at its lower portion a plurality of openings through which animals may feed, and a central upwardly extending cylindrical member at the bottom of said silo, having an opening through it.

4. A silo having at its lower portion a plurality of openings through which animals may feed, a device on the interior of the silo above the level of said openings, for engaging downwardly moving ensilage, and a central upwardly extending cylindrical member at the bottom of said silo, having an opening through it to permit ensilage to pass downwardly from the central portion of the silo, said silo being designed to be used in connection with a passageway leading to a point below the central part of the silo.

5. A silo having at its lower portion a plurality of openings through which animals may feed, a central upwardly extending cylindrical member at the bottom of said silo, having openings at its upper and lower ends, a closure device for one of said openings, and means for controlling said closure device.

6. A silo having at its lower portion a plurality of openings through which animals may feed, a central upwardly extending cylindrical member at the bottom of said silo, and means for imparting rotation to said cylindrical member.

7. A silo having at its lower portion a plurality of openings through which animals may feed, a central upwardly extending cylindrical member at the bottom of said silo, having openings at its upper and lower ends, a closure device for one of said openings, means for controlling said closure device, and means for imparting rotation to said cylindrical member.

8. A silo having at its lower portion a plurality of openings through which animals may feed, an upwardly extending member in the central portion of the silo, at the bottom thereof, and means for imparting motion to said member.

9. In a device of the class described, a silo having at its lower portion an opening through which animals may feed, and separate means on the interior of the silo at the wall thereof and approximately at the center thereof respectively, for effecting and controlling the down flow of ensilage.

10. In a device of the class described, a silo having at its lower portion a number of openings through which animals may feed, and means on the interior of the silo near the wall and the central portion thereof respectively, for contracting the space inside the silo through which the ensilage travels toward said openings.

Des Moines, Iowa, August 29, 1917.

LOREN D. HART.

Copies of this patent may be obtained for five cents each, by addressing the "Commissioner of Patents, Washington, D. C."